United States Patent
Van Rijn et al.

(10) Patent No.: US 11,716,591 B2
(45) Date of Patent: Aug. 1, 2023

(54) DETERMINING A POSITION OF A MOBILE COMMUNICATION DEVICE

(71) Applicant: K. Mizra LLC, Cape Coral, FL (US)

(72) Inventors: Martin Van Rijn, 's-Gravenhage (NL); Franciscus Hendrikus Elferink, 's-Gravenhage (NL)

(73) Assignee: K. Miza LLC, Cape Coral, FL (US)

( * ) Notice: Subject to any disclaimer, the term of this patent is extended or adjusted under 35 U.S.C. 154(b) by 0 days.

(21) Appl. No.: 17/993,090

(22) Filed: Nov. 23, 2022

(65) Prior Publication Data

US 2023/0082438 A1 Mar. 16, 2023

Related U.S. Application Data

(63) Continuation of application No. 17/024,641, filed on Sep. 17, 2020, now Pat. No. 11,540,085, which is a
(Continued)

(30) Foreign Application Priority Data

Jan. 31, 2013 (EP) .................................... 13153445

(51) Int. Cl.
*H04W 4/02* (2018.01)
*G01S 5/06* (2006.01)
(Continued)

(52) U.S. Cl.
CPC ......... *H04W 4/023* (2013.01); *G01S 5/02213* (2020.05); *G01S 5/06* (2013.01);
(Continued)

(58) Field of Classification Search
CPC ............ G01S 1/24; G01S 5/0221; G01S 5/06; H04W 4/023; H04W 56/0015; H04W 72/0453; H04L 5/0048
See application file for complete search history.

(56) References Cited

U.S. PATENT DOCUMENTS

| 5,327,144 A | 7/1994 | Stilp et al. |
| 6,249,680 B1 | 6/2001 | Wax et al. |

(Continued)

FOREIGN PATENT DOCUMENTS

| DE | 10305091 A1 | 8/2004 |
| EP | 2487503 A1 | 8/2012 |

(Continued)

OTHER PUBLICATIONS

International Search Report and Written Opinion for PCT Application No. PCT/NL2014/050060, dated May 3, 2014, pp. 10.
(Continued)

*Primary Examiner* — Joshua L Schwartz
(74) *Attorney, Agent, or Firm* — Kinney & Lange, P.A.

(57) ABSTRACT

A method of determining a position of a mobile telecommunication device (10) which transmits a signal (S) to base stations (1, 2, 3, ... ) connected by a data link (8) comprises the steps of: correlating the received signal (S) and a reference signal (S') so as to produce a correlation for each base station, detecting a maximum in each correlation, which maximum is indicative of a time of arrival of the signal (S) at the respective base station, and using the respective times of arrival and the distances (D1, D2, ... ) derived therefrom to derive a location of the mobile telecommunication device. The method uses receivers (21, 22, ... ) coupled to a data network (7), each receiver (21, 22, ... ) deriving the reference signal (S') from the
(Continued)

received signal (S). Each base station may select, if it receives multiple reference signals, the reference signal (S') having the highest quality.

15 Claims, 4 Drawing Sheets

Related U.S. Application Data continuation of application No. 14/765,059, filed as application No. PCT/NL2014/050060 on Jan. 31, 2014, now Pat. No. 10,812,933.

(51) Int. Cl.
*G01S 5/02* (2010.01)
*H04L 5/00* (2006.01)
*H04W 56/00* (2009.01)
*H04W 72/04* (2023.01)
*H04W 72/0453* (2023.01)

(52) U.S. Cl.
CPC ....... *H04L 5/0048* (2013.01); *H04W 56/0015* (2013.01); *H04W 72/0453* (2013.01)

(56) References Cited

U.S. PATENT DOCUMENTS

| | | |
|---|---|---|
| 6,275,186 B1 | 8/2001 | Kong |
| 6,876,859 B2 | 4/2005 | Anderson et al. |
| 7,020,473 B2 | 3/2006 | Splett |
| 7,990,317 B2 | 8/2011 | Davis et al. |
| 9,197,989 B2 | 11/2015 | Choi |
| 10,812,933 B2 | 10/2020 | Van Rijn et al. |
| 2002/0098852 A1 | 7/2002 | Goren et al. |
| 2003/0069025 A1 | 4/2003 | Hoctor et al. |
| 2003/0129996 A1 | 7/2003 | Maloney et al. |
| 2012/0020320 A1 | 1/2012 | Issakov et al. |
| 2012/0302256 A1 | 11/2012 | Pai et al. |

FOREIGN PATENT DOCUMENTS

| | | |
|---|---|---|
| FR | 2902195 A1 | 12/2007 |
| GB | 2387084 A | 10/2003 |
| WO | 2008123774 A1 | 10/2008 |
| WO | 2010019477 A1 | 2/2010 |

OTHER PUBLICATIONS

International Search Report for IPRP for PCT Application No. PCT/NL2014/050060, dated Aug. 4, 2015, pp. 7.

DETERMINING A POSITION OF A MOBILE COMMUNICATION DEVICE

CROSS-REFERENCE TO RELATED APPLICATIONS

This application is a continuation of U.S. application Ser. No. 17/024,641 filed Sep. 17, 2020 for "DETERMINING A POSITION OF A MOBILE COMMUNICATION DEVICE," which in turn claims the benefit of U.S. Pat. No. 10,812,933, application Ser. No. 14/765,059, filed Jul. 31, 2015, and issued Sep. 30, 2020, which is a National Stage Entry of International Patent Application No. PCT/NL2014/050060, filed Jan. 31, 2014, which is the PCT filing of EP application 13153445.5 filed Jan. 31, 2013. The entireties of these related applications are incorporated herein by reference.

BACKGROUND

The present invention relates to determining a position of a mobile telecommunication device. More in particular, the present invention relates to a method of determining a position of a mobile communication device which transmits a signal to base stations, which base stations are connected by a data network and have known locations. The present invention also relates to a base station for use in a mobile telecommunication system, the base station being arranged for determining a position of a mobile communication device.

It is often desired to determine the position of a mobile communication or telecommunication device, such as a mobile (i.e. cellular) telephone. The user of the mobile device may want to receive directions, for which her present location is necessary. Or a system may be designed to determine which mobile device users are in each other's vicinity so as to notify these users or exchange information between them.

Several prior art methods of determining a position are known. Some of these prior art methods are based on signal propagation times, using the time duration between the transmission and the reception of an electromagnetic signal (i.e. a radio signal or a light signal) to determine distances. Radar is the best known example of such techniques. Other prior art methods involve mobile telecommunication devices and rely on properties of the cellular networks that are used by these devices. International patent application WO 2008/123774 (TNO), for example, discloses a location detection method based on cell transition detection.

Most prior art position determination methods are designed for outdoor use, involving relatively large distances and areas. It is an aim to provide a method and apparatus which are particularly, although not exclusively, suitable for indoor use, involving relatively small distances and areas. In addition, it is an aim to avoid using typical cellular network features such as cell transitions, as such features provide insufficient accuracy for indoor use.

French patent application FR 2 902 195 (Thales) discloses a method for determining the moment of arrival of a non-pulsed radio signal, which method can be used for determining the location of mobile telephones in cellular communication systems. More in particular, FR 2 902 195 appears to disclose the steps of receiving the wireless signal of the mobile telephone at two or more base stations, providing a reference signal at those base stations, correlating the received wireless signal and the reference signal so as to produce a correlation (referred to as "intercorrelation") for each base station, detecting a maximum in each correlation, which maximum is indicative of a time of arrival of the signal at the respective base station, deriving from the times of arrival respective distances to the mobile telecommunication device and using the respective distances and the respective known locations to derive a location of the mobile telecommunication device.

The reference signal used in FR 2 902 195 can be either a permanently stored reference signal or a synthetic replica of a received signal. Using a permanently stored (that is, fixed) reference signal has the disadvantage that only a single, predetermined signal can be used as position determination signal, all other signals will either produce no significant correlation or a false correlation. In either case, an incorrect distance measurement and hence an incorrect location determination will result. Using a synthetic replica involves, according to FR 2 902 195, demodulating a string of symbols contained in the received signal and producing a modulated signal containing the string of symbols. That is, the reference signal is reconstructed using the information contained in the received signal. This known method has the disadvantage that significant differences may exist between the received signal and the reconstructed signal, resulting in lower (or even incorrect) correlation values. In addition, since the reference signal is derived from the signal received by the same base station, it may differ between base stations, resulting in a non-uniform reference.

International patent application WO 2010/019477 (True-Position) discloses location measurement units (LMUs) capable of detecting mobile to network signals in order to locate wireless devices. The LMUs are co-located with, or integrated in, the base stations of the wireless network provider and are arranged to demodulate signals of interest. Demodulated reference signals are sent to other LMUs, which re-modulate the reference and uses it in a correlation process to determine the time of arrival of the signal of interest. The system of WO 2010/019477 therefore uses reproduced reference signals, which may lead to correlation errors. In addition, the path lengths of the wireless signals to the LMUs are no shorter than those to the base stations and therefore expose those wireless signals to interference.

SUMMARY

It is an object to overcome these and other problems of the Prior Art and to provide a method and apparatus that use a more reliable and more uniform reference signal, while avoiding the disadvantages of a fixed, permanently stored reference signal or a reproduced reference signal.

Accordingly, a method is provided of determining a position of a mobile telecommunication device which transmits a signal to base stations connected by a data link and having known locations, the method comprising the steps of:

receiving the signal at two or more base stations wirelessly, providing a reference signal at the base stations, correlating the signal and the reference signal so as to produce a correlation for each base station, detecting a maximum in each correlation, which maximum is indicative of a time of arrival of the signal at the respective base station, deriving from the times of arrival respective distances to the mobile telecommunication device and, using the respective distances and the respective known locations to derive a location of the mobile telecommunication device, the method being characterised by providing a data network coupled to the data link,
providing receivers coupled to the data network,
deriving by A/D conversion the reference signal from the signal as received by each receiver, and
forwarding the reference signal to the base stations through the data network and the data link.

By deriving the reference signal from the signal as received by receivers coupled to a data network, a second signal path is used to derive the reference signal: the signal path between the mobile device and the receivers. The receivers typically will not have the same location as the base stations, although in some cases the location of a receiver and of a base station may substantially coincide. By providing multiple receivers in various locations, the signal path from the mobile device to a receiver will typically be shorter than the signal path from the mobile device to a base station, thus reducing interference and noise.

According to one aspect a mobile telecommunications network with a plurality of base stations is used, and receivers that are not involved in the operation of that mobile telecommunications network are added, which are constructed for receiving a reference signal and forwarding the received reference signal to the base stations of the mobile telecommunications network.

The reference signal is derived from the received signal using A/D conversion (that is, analogue/digital conversion). In other words, the reference signal is essentially a digitised version of the received signal. Although the digitised signal may be processed to make it more suitable, for example by selecting a time-limited part of the signal, the reference signal is not obtained by reconstruction or remodulation. It is preferred to derive the reference signal from the signal received by the receivers by A/D conversion only, thus eliminating all signal processing, although the reference signal may be truncated in time and may, in some embodiments, be subjected to (preferably lossless) compression to facilitate its transmission to the base stations.

In other words, the reference signal is essentially an A/D converted received signal, forwarded from a receiver close to the signal source through a digital network to one or more base stations. It is noted that the main signal processing (such as correlating and detecting a maximum correlation) is performed in the base stations (or a central unit), not in the receivers.

In an advantageous embodiment, the data network and the receivers may be configured for WLAN access, preferably using techniques complying with IEEE 802.11 specifications. Thus, a WLAN access network may advantageously be utilized to receive and forward signals that may be used as reference signals. In such an embodiment, the receivers are configured as WLAN receivers.

It is preferred that at least one of the receivers has a location which is distinct from the location of any of the base stations. More preferably, most if not all receivers have locations which do not coincide with base station locations. Thus receivers can be used that are closer to the signal source (that is, the mobile device) than the base stations.

By forwarding the digitised signal through the data network and the data link, signal deterioration is avoided as deterioration of the digitised signal is highly unlikely. As multiple receivers may transmit multiple digitised received signals to the base stations, each base station may receive more than one digitised signal to be used as reference signal. This allows a selection of a suitable version of the reference signal.

The base stations are preferably configured for selecting the reference signal having the highest quality. This allows the base stations to select the best reference signal if they receive multiple reference signals. Those skilled in the art will understand that various quality measures may be used, for example signal-to-noise ratio, signal amplitude, etc., or a combination of such quality measures.

As all base stations will select the best version from the available versions of the reference signal on the basis of a common criterion, the reference signal used by the base stations will be uniform. As the reference signals, or reference signal candidates, produced by the receivers are digital signals, digital signal comparison and processing is made possible.

The known locations of the base stations are preferably absolute locations, that is, fixed locations of the base stations which may be measured relative to a coordinate system, as used in GPS (Global Positioning System) for example. In some applications the locations of the base stations may be relative, that is, relative to each other. This may be the case, for example, when the base stations are situated on a ship. As a result of using relative locations of the base stations, the found position of the mobile telecommunication device will be relative rather than absolute.

It is preferred that the signal transmitted by the mobile device and used to determine its location is a continuous signal, in particular that the signal is a modulated digital communication signal.

In order to determine the time of arrival of signals, a time reference is required. However, local clocks of base stations may have deviations from the "true" time. In order to take these deviations into account, it is preferred that the method further comprises the steps of:

providing a local clock in each base station for determining the times of arrival of the signal,
exchanging timing messages between the base stations,
deriving from the timing messages any time deviations of the local clocks, and
determining the time of arrival of the signal at each base station using the respective local clock and the respective time deviation. That is, timing messages are exchanged between the base stations to determine any deviations of local clocks. This deviations are, in turn, used to correct the times of arrival. Thus, the times of arrival of the signal transmitted by the mobile telecommunication device can be determined in each base station with great accuracy, as any clock deviations are compensated. Accordingly, the transmission time differences and hence the distances of the base stations relative to the mobile telecommunication device can be accurately determined.

In a particularly preferred embodiment, the method additionally comprises the steps of:

each transmitting base station registering the time of transmission of each timing message, and
each receiving base station registering the time of receipt of each timing message, and
determining the time deviation of a second base station relative to a first base station by $$\epsilon_2 = (tr1 + tt1 - tt2 - tr2)/2,$$

where $\epsilon_2$ is the time deviation of a second base station, tt1 and tt2 are the times of transmission at a first and a second base station respectively, and tr1 and tr2 are the times of receipt at the first and the second base station respectively. In this way, the time deviations of the base stations can be determined very efficiently and very accurately.

In some embodiments, the timing messages may contain the time of transmission at the transmitting base station. This simplifies the calculation of time differences, making the determination of the time deviations even more efficient.

The timing messages may be constituted by pulse-shaped signals. However, this is not essential and continuous timing signals, for instance frequency modulated continuous timing signals can also be used.

In an advantageous embodiment, the timing messages are constituted by frequency modulated (FM) signals, preferably signals having a linear frequency sweep. This allows an improved distance detection using phase information contained in the frequency modulated signals. FMCW (frequency modulated continuous wave) signals are particularly preferred as FMCW signals produce the highest correlation accuracy.

Although the timing messages are preferably exchanged wirelessly between the base stations, using the antennas of the base stations, it is also possible to transmit some or all timing messages by wired connections.

A base station is provided for use in a mobile telecommunication system, the base station comprising:

a first signal reception unit for wirelessly receiving a signal from a mobile telecommunication device, a second signal reception unit for receiving a reference signal, a memory unit for storing the signal, and a processor unit for processing the signal and the reference signal, and being arranged for:

correlating the signal and the reference signal so as to produce a correlation for each base station, detecting a maximum in each correlation, which maximum is indicative of a time of arrival of the signal at the respective base station, deriving from the times of arrival respective distances to the mobile telecommunication device and, using the respective distances and the respective known locations to derive a position of the mobile telecommunication device, characterised by the second signal reception unit comprising a network interface unit for interfacing with a data network to which signal receivers capable of forwarding reference signals are coupled. The base station may advantageously be arranged for selecting, if it receives multiple reference signals, the reference signal having the highest quality.

Further a system is provided for determining a position of a mobile telecommunication device which transmits a signal, the system comprising at least three base stations as defined above. Such a system may also comprise a central unit to which the base stations transmit position data.

Additionally a computer program product is provided for carrying out the method defined above. A computer program product may comprise a set of computer executable instructions stored on a tangible data carrier, such as a CD, a DVD or a memory stick. The set of computer executable instructions, which allow a programmable computer to carry out the method as defined above, may also be available for downloading from a remote server, for example via the Internet. In particular, the steps of correlating the received signal and the reference signal, detecting a maximum in the resulting correlation, deriving distances and a position from the detected maximum, and also the step of selection the highest quality reference signal, for example, may be carried out by a computer program.

BRIEF DESCRIPTION OF THE DRAWINGS

These and other aspects will further be explained below with reference to exemplary embodiments illustrated in the accompanying drawings, in which.

DETAILED DESCRIPTION

Figure 1:
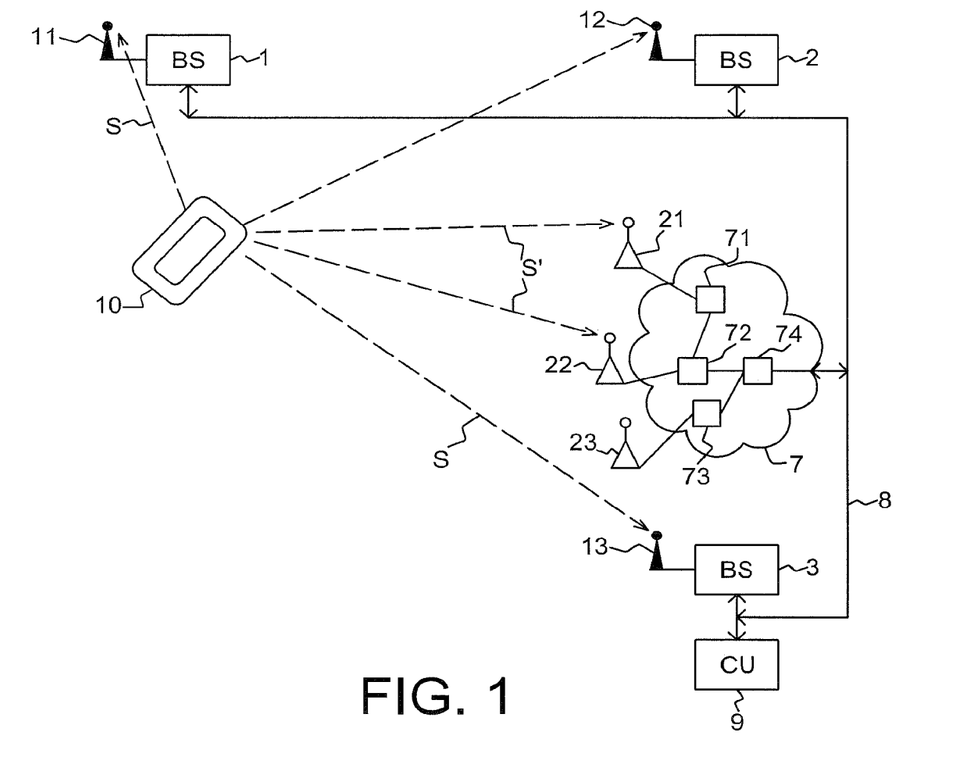
FIG. 1 schematically shows a system in which a mobile device can be located.

The system shown merely by way of non-limiting example in FIG. 1 comprises base stations (BS) 1, 2 and 3, a mobile telecommunication device 10 and a data network 7. The mobile telecommunication device 10 may be a mobile (i.e. cellular) telephone, a smartphone, a portable computer provided with telephone facilities, or any other portable communication device capable of transmitting a communication signal S which can be received by the base stations 1, 2 and 3.

Each base station is configured for supporting mobile (that is cellular) telecommunications, for example telecommunications in accordance with LTE (Long Term Evolution) or 4G. The base stations are part of a wireless communication network wherein they perform functions of transmission and reception of wireless signals as part of the wireless communication network operation. Accordingly, each base station defines a geographic wireless cell of the wireless communication network in which wireless telecommunication through the wireless communication network is supported via the base station.

The base stations 1, 2 and 3 are connected by a data link 8, which allows the base station to exchange information and, in particular, allows the base stations to receive reference signals. The data link 8 preferably is a wired link (e.g. a data cable) but may also be constituted by a wireless link. The data network 7 is coupled to the link 8 as well. In the embodiment shown, a central unit (CU) 9 is also coupled to the link 8, thus allowing the base stations 1, 2 and 3 to communicate with the central unit 9 and the data network 7.

The central unit 9 may be constituted by a suitably configured computer unit and may be capable of receiving information from the base stations, processing that information and supplying selected information, for example a location, to a device capable of displaying the selected information. A suitable display unit may be part of the central unit 9. In some embodiments, the central unit 9 carries out the reference signal selection and processing tasks that are carried out by the base stations in other embodiments.

The data network may be a conventional data network capable of digitally transferring data. The data network 7 shown in FIG. 1 comprises a plurality of switching units 71, 72, 73, . . . which are connected by suitable data links. In the embodiment shown, switching unit 74 is connected to the link 8. Receiver units 21, 22 and 23 are connected to the switching units 71, 72, 73 and 74 respectively and serve to receive the signal S so as to provide a reference signal, as will later be explained in more detail with reference to FIG. 3. Even though three receiver units are shown in FIG. 1 by way of example, this number is not crucial and even a single receiver unit could be sufficient. It is preferred, however, to provide more two or more receiver units, in order to improve the quality of the reference signal.

Each base station 1, 2 and 3 is provided with an antenna 11, 12 and 13 respectively for receiving the signal S transmitted by the mobile telecommunication device 10. Accordingly, each base station receives the signal S directly via its antenna and indirectly via the data network 7 and its receiver units 21, 22 and 23. The indirectly received signal S', which during the wireless part of its transmission is identical to the original signal S, is used as reference signal. As the transmission time from the receiver units 21-23 through the data network 7 and the link 8 to the base stations 1-3 normally is longer than from a base station antenna (e.g. 11) to the associated base station (e.g. 1), the reference signal S' will typically reach a base station later than the original signal S, even if a receiver unit is closer to the mobile telecommunication device than the base station antenna is. In order to be able to compare the directly received original signal S and the indirectly received reference signal S', the original signal S is delayed in the base stations, at least until the reference signal S' is received by the respective base station.

Delaying the reference signal S' is preferably achieved by temporarily storing this signal. That is, the reference signal S' is stored in a memory unit of each base station, at least until it can be compared with the original signal S. This will later be explained in more detail with reference to FIGS. 4 and 5.

It will be understood that the system may comprise more than three base stations. For the system to accurately locate a mobile device, at least three base stations are required, which base stations must be sufficiently spaced apart. In practice, it will be advantageous to utilize more than three base stations as this will improve the accuracy of the mobile device's position.

It is noted that the base stations may be conventional base stations used for UMTS, LTE or similar mobile telecommunication systems. However, in preferred embodiments the base stations are dedicated base stations configured for indoor use. Advantageously, the base stations may be configured both for general (e.g. LTE) and indoor (e.g. WLAN) use.

Figure 2:
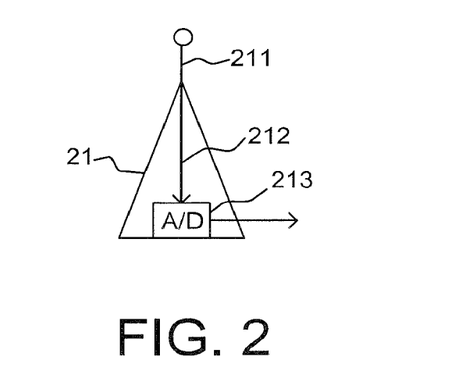
FIG. 2 schematically shows a receiver unit which can be used in the system according to FIG. 1.

An exemplary embodiment of a receiver unit is schematically illustrated in FIG. 2. The receiver unit of FIG. 2 comprises an antenna 211 and an A/D (analogue/digital) converter 213 which are connected by a cable 212 (in some embodiments, this connection may be wireless). The antenna 211 receives the analogue signal S' which is converted into a digital signal by the A/D converter 213 and forwarded to the data network 7 (FIG. 1). In most embodiments, no further signal processing takes place, except from preferably limiting the time duration of the signal. That is, preferably a time-limited section of the digitised signal S' is forwarded rather than a continuous stream. The time-limited signal section may have a duration of less than 1 ms (millisecond), preferably less than 0.1 ms. In some embodiments, the signal section may have a duration of a few microseconds. The digital signal may be compressed to facilitate its transmission, preferably using lossless compression. To this end, the A/D unit 213 may be provided with a signal compression unit which may use conventional signal compression (i.e. coding) techniques. It will be understood that the receiver units may additionally comprise an interface unit (not shown) for interfacing with the data network 7.

The base stations operate as part of a wireless communication network wherein they perform functions of transmission and reception of wireless signals in wireless network telecommunication for their geographic area. In contrast to the base stations, the receiver units 21-23 are not configured for mobile telecommunication but may be configured for wireless communication with portable devices. The wireless telecommunication network operation in a cell that contains the receiver units 21-23 proceeds without involvement of the receiver units 21-23 in that cell. As a result, the receiver units are inexpensive units. This allows a relatively large number of receiver units to be installed, if desired, for example a plurality in the same wireless network cell.

Figure 3:
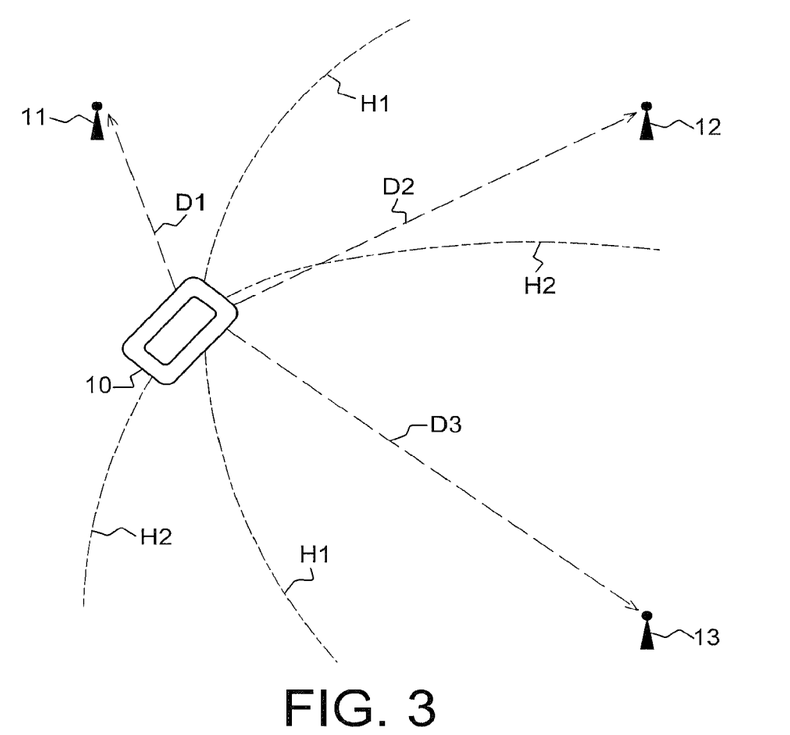
FIG. 3 schematically shows how distances can be determined using several base stations.

FIG. 3, which shows parts of the system of FIG. 1, schematically illustrates various aspects. The mobile communication device 10 is located at a distance D1 from the antenna 11 of the first base station (1 in FIG. 1), and at distances D2 and D3 from the antennas 12 and 13 of the second and third base stations (2 and 3 in FIG. 1) respectively. By determining the moment in time at which the signal (S, S' in FIG. 1) reaches the antennas 11, 12 and 13, the distances D1, D2 and D3 can be determined, or at least the differences between those distances, as will be explained in more detail below.

The principles of multilateration, also known as hyperbolic navigation are used. Each pair of base stations determines a time difference between the arrival of the signal S at the respective base stations (or, more precisely, at their antennas), each time difference being caused by a difference in distance to the source of the signal, that is, the mobile communication device 10. For each pair of base stations, this time difference results in a hyperbola on which the origin of the signal S, here the mobile communication device 10, is located. In the schematic example of FIG. 3, hyperbola H1 is defined by the base station pair 1, 2 while hyperbola H2 is defined by the base station pair 2, 3. The intersection of two hyperbolas H1, H2 indicates the position of the device 10.

It is noted that in the two-dimensional case illustrated in FIGS. 1 and 3, two hyperbolas are sufficient to determine the location of the device 10. In a three-dimensional case, three hyperbolas are required.

The hyperbolas H1 and H2 are determined relative to the positions of the base stations, resulting in a relative position. Preferably, however, the locations of the base stations are known and as a result, the found position of the mobile communication device will be an absolute position.

The moments in time at which the signals reach the antennas 11, 12 and 13 of their associated base stations 1, 2 and 3 respectively are determined by correlating the wirelessly received original signal S and the reference signal S' received via the data network 7. Although this correlation may be carried out in the central unit, it is preferred that it is carried out in the base stations, as this reduces the required transfer of data.

Figure 4:
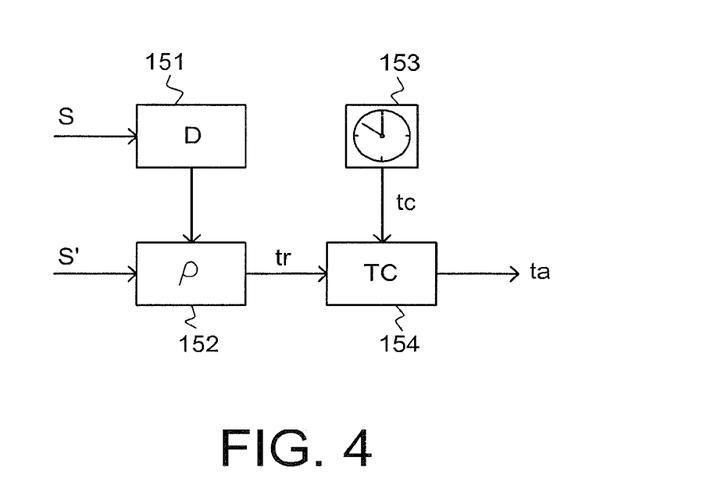
FIG. 4 schematically shows how the time of arrival of a signal can be determined in a base station.

FIG. 4 schematically illustrates how the original signal S and the reference signal S' may be processed in a base station. As mentioned above, the reference signal S' typically reaches the base stations later than the original signal S. To allow a correlation of corresponding signal parts, the original signal S is delayed (D) in step 151. It is noted that the delays of all base stations should be identical to allow a proper time of arrival determination. The delay is chosen so as to approximately correspond to an expected delay of the reference signal S' in the data network (7 in FIG. 1). This will allow the corresponding parts of the reference signal and the original signal to be correlated. The delay may be embodied by a shift register or similar structure, or by a memory in which the signal is temporarily stored.

In step 152, the reference signal S' and the (delayed) original signal S are correlated (p), resulting in a time tr which is indicative of the correlation peak relative to the beginning of the signal S. It is noted that the arrival of the signal S, or of a particular part of signal S, should be registered to allow the relative position of the correlation peak to be determined. In step 153, a clock time tc is retrieved and in step 154, the temporal occurrence of the correlation peak tr is combined with the clock time tc to produce the time of arrival ta for the base station. This time of arrival ta is used in further steps (not shown) together with times of arrival produced by the other base stations to determine time of arrival differences, which in turn are used to produce differences in distances traveled and the hyperbolas illustrated in FIG. 1.

Figure 5:
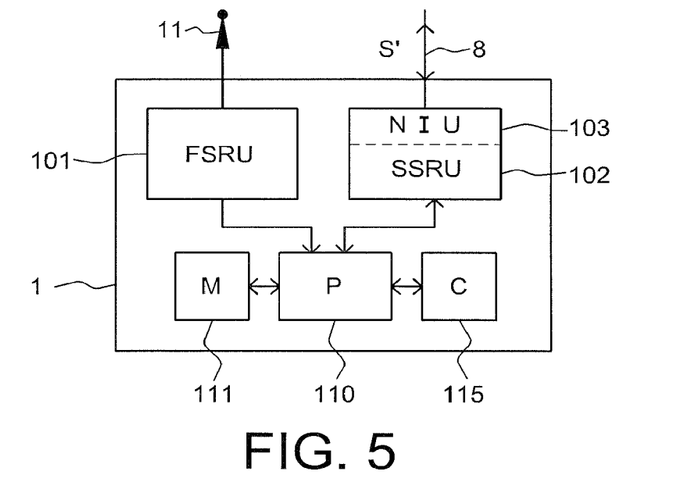
FIG. 5 schematically shows a base station which may be used in the method and system.

An exemplary base station configured to carry out the steps of FIG. 4, is schematically illustrated in FIG. 5. The base station 1 comprises a first signal reception unit (FSRU) 101, a second signal reception unit (SSRU) 102, a network interface unit (NIU) 103, a processor (P) 110, a memory (M) 111 and a clock (C) 115. In the embodiment shown, the network interface unit 103 is integral with the second signal reception unit 102. In some embodiments, a single integrated signal reception unit may replace the first and second signal reception units 101 and 102, and/or a delay unit (not shown) may be arranged between the first signal reception unit 101 and the processor 110.

The first signal reception unit 101 receives the original signal S from the antenna 11 while the second signal reception unit 102 receives the reference signal S' from the link 8 via the network interface unit 103. As mentioned above, the link 8 connects the base stations with the data network 7 to which in turn the receivers 21 are connected.

Multiple versions of the reference signal S' may reach the base station 1, as there are multiple receivers (21-23 in FIG. 1) which may receive the signal. The base station selects (the version of) the reference signal S' having the highest signal quality, thus rejecting all others. To this end, the processor 110 of the base station may be configured to determine the signal-to-noise (S/N) ratio of (the various versions of) the reference signal S' and/or other signal parameters and then to select the best available in terms of the applied quality criteria.

As mentioned above, the original signal S is delayed (that is, temporarily stored) in the base stations. To limit the amount of memory required for the temporary storage, only a section of the original signal S is stored, together with the moment in time (measured by the local clock of the base station) at which the beginning of this section was received. The stored section may have a duration of several ms (milliseconds), although both larger (e.g. 0.1 second) and smaller (e.g. 0.1 ms=100 .mu.s) sections may be used.

Accordingly, the memory unit 111 stores suitable processor instructions for carrying out the required signal processing steps and also stores the original signal S. The signal processing steps include correlating the original signal S and the reference signal S'. As the original signal S and the reference signal S' are essentially the same signal, the correlation will be low unless the signal sections are properly aligned in time, at which point the correlation will exhibit a peak. The time shift of the two signal sections is a precise measure of the delay of the original signal as it covered the distance (D1 in FIG. 3) from the mobile communication device to the base station 1. Accordingly, the processor 110 will produce a time indication derived from the correlation peak. This time indication is combined with the local time indicated by the clock 115 and is in base stations 2 and 3 corrected by a correction factor, the so-called time deviation, as will be explained below.

According to a further aspect, the base stations exchange timing messages which are provided to determine any deviations of the clocks. Typically, the clocks will not be perfectly synchronised and this is not even necessary if the deviations can be determined with sufficient accuracy.

Figure 6:
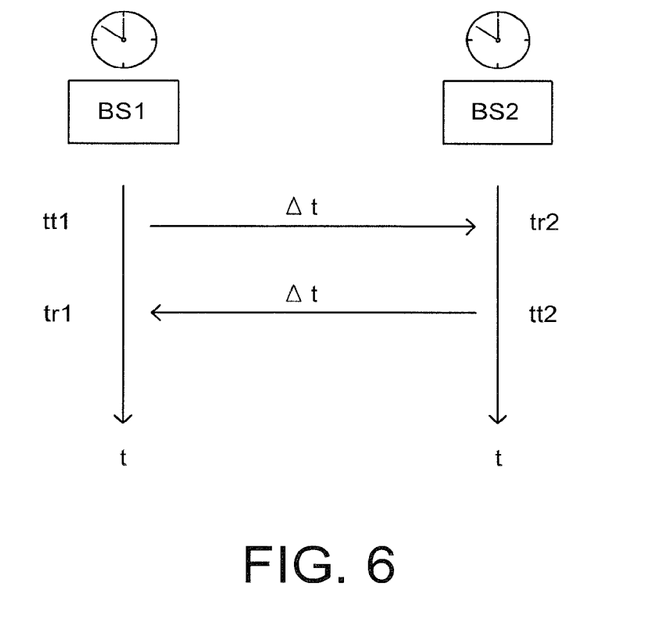
FIG. 6 schematically shows the steps of determining base station clock differences.

As schematically illustrated in FIG. 6, the base stations 1, 2 and 3 are configured for exchanging timing messages. If the first base station 1 (BS1 in FIG. 6) transmits a timing message at t=tt1 (time of transmission 1), this message is received at the second base station 2 at local time t=tr2 (time of receipt 2). The delay of this timing message is .DELTA.t, which is determined by the distance between the base stations (time of flight) and their response times. Upon receipt of the first timing message, the second base station 2 (BS2) returns a second timing message at local time t=tt2, which timing message is received by the first base station at t=tr1. The timing messages contain the (local) times of transmission. It can be shown that the time deviation of the second base station relative to a first base station can be determined by $$.epsilon.2 = (tr1 + tt1 - tt2 - tr2)/2$$

As explained above, .epsilon.2 is the time deviation of the second base station, tt1 and tt2 are the times of transmission at a first and a second base station respectively, and tr1 and tr2 are the times of receipt at the first and the second base station respectively.

Those skilled in the art will readily derive similar expressions for the time deviation .epsilon.3 of the third base station and corresponding time deviations of any further base stations.

Using these simple steps, any deviations of the local clocks of the base stations can be determined. These deviations can, in turn, be used to compensate any delay times and hence compensate the distances used for determining the position of the mobile communication device.

Figure 7:
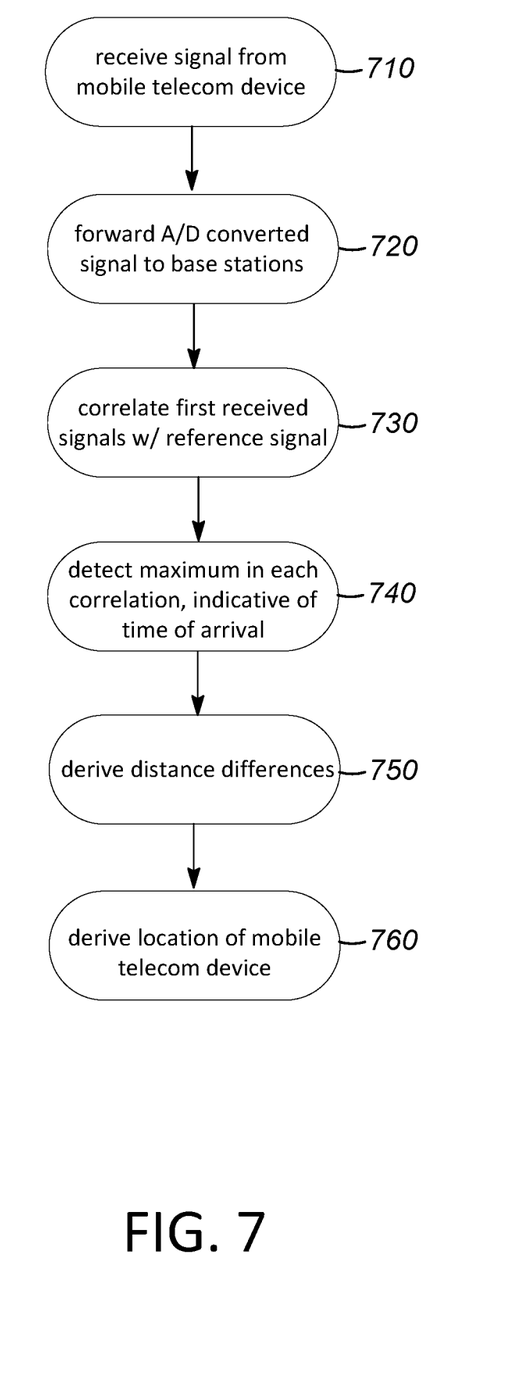
FIG. 7 illustrates a method of determining a position of a mobile telecommunication device.

FIG. 7 illustrates an exemplary method of determining a position of a mobile telecommunication device which transmits a signal to two or more base stations connected by a data link and having known locations. The method comprises the steps of receiving 710 the signal from the mobile telecommunication device at the two or more base stations wirelessly, as first received signals of the base stations; forwarding 720, through the data link and a data network coupled to the data link, an A/D converted signal to the base stations, and using the A/D converted signal as a reference signal, with the A/D converted signal being derived from the signal from the mobile telecommunication device, as received by a receiver outside the base stations and coupled to the base stations via the data network; correlating 730 the first received signals of the base stations with the reference signal to produce a correlation for each base station; detecting 740 a maximum in each correlation, which maximum is indicative of a time of arrival of the signal from the mobile telecommunication device at the respective base station; deriving 750 from the times of arrival respective distance differences between distances from the base stations to the mobile telecommunication device, and; using the respective distance differences and the respective known locations for deriving 760 a location of the mobile telecommunication device. According to the illustrated method, other than using the AID converted signal as the reference signal in deriving the respective distance differences, neither the AID converted signal nor a location of the receiver is used to derive the location of the mobile telecommunication device in the step of using the respective distance differences and the respective known locations to derive a location of the mobile telecommunication device.

The insight is used that a reference signal for correlation purposes can advantageously be transmitted via a digital network. The further insight is used that differences between local clocks in base stations can be determined in a simple yet very effective manner.

As the position of the source of the signal, in the above embodiments the mobile communication device, can be determined with great accuracy, the present invention is suitable for indoor use.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents. The words "location" and "position" can be used interchangeably.

It will be understood by those skilled in the art that the present invention is not limited to the embodiments illustrated above and that many modifications and additions may be made without departing from the scope of the invention as defined in the appending claims.

The invention claimed is:

1. A base station having a known location for use in a mobile telecommunication system, the base station comprising:
   a first signal reception unit for wirelessly receiving a cellular signal from a mobile telecommunication device;
   a second signal reception unit for receiving a WLAN reference signal;
   a memory unit for storing the cellular signal; and
   a processor unit for processing the cellular signal and the WLAN reference signal, and being configured for:
   correlating the cellular signal and the WLAN reference signal so as to produce a correlation for each base station;
   detecting a maximum in each correlation, which maximum is indicative of a time of arrival of the cellular signal at the respective base station;
   deriving from the times of arrival respective distances to the mobile telecommunication device; and
   using the respective distances and the respective known locations to derive a location of the mobile telecommunication device, characterized by the second signal reception unit comprising a network interface unit for interfacing via a data link, with a data network to which signal receivers capable of forwarding WLAN reference signals are coupled.

2. The base station according to claim 1 for determining a position of a mobile telecommunication device which transmits a signal, the system comprising at least three base stations.

3. The base station according to claim 1, wherein at the second signal reception unit has a location which is distinct from the first signal reception unit.

4. The base station according to claim 2, wherein each base station selects the WLAN reference signal having the highest quality.

5. The base station according to claim 4, further comprising the step of determining a signal-to-noise ratio of the WLAN reference signal so as to select the WLAN reference signal having the highest quality.

6. The base station according to claim 5, wherein the cellular signal is a modulated digital communication signal.

7. The base station according to claim 6, wherein the cellular signal is a continuous signal.

8. The base station according to claim 7, wherein at the second signal reception unit has a location which is distinct from the first signal reception unit.

9. The base station according to claim 7, further comprising the steps of:
   providing a local clock in each base station for determining the times of arrival of the cellular signal:
   exchanging timing messages between the base stations;
   deriving from the timing messages any time deviations of the local clocks; and
   determining the time of arrival of the cellular signal at each base station using the respective local clock and the respective time deviation.

10. The base station according to claim 9, further comprising the steps of:
    each transmitting base station registering the time of transmission (tt1, tt2, . . . ) of each timing message; and
    each receiving base station registering the time of receipt (tr1, tr2, . . . ) of each timing message;
    determining the time deviation of a second base station relative to a first base station by £2=(tr1+tt1−tt2−tr2)/2.

11. The base station according to claim 10, wherein at the second signal reception unit has a location which is distinct from the first signal reception unit.

12. The base station according to claim 9, wherein the timing messages contain the time of transmission (tt1, tt2, . . . ) at the transmitting base station.

13. The base station according to claim 10, wherein the timing messages are constituted by pulse-shaped signals which are transmitted wirelessly.

14. The base station according to claim 10, wherein the timing messages are constituted by frequency modulated signals having a linear frequency sweep.

15. The base station according to claim 11, wherein the timing messages are constituted by frequency modulated signals having a linear frequency sweep.

* * * * *